United States Patent [19]

Spitler et al.

[11] 4,128,512

[45] Dec. 5, 1978

[54] POST TREATMENT OF FLEXIBLE POLYURETHANE FOAM WITH ORGANIC SILOXANES FOR INCREASING THE WATER ABSORBENCY AND PENETRATION

[75] Inventors: Keith G. Spitler, Bethel Park; David A. Radovich, Coraopolis, all of Pa.

[73] Assignee: Mobay Chemical Corporation, Pittsburgh, Pa.

[21] Appl. No.: 845,690

[22] Filed: Oct. 26, 1977

[51] Int. Cl.$^2$ .......................... C08J 9/00; C08G 18/44
[52] U.S. Cl. ...................................... 521/55; 521/905
[58] Field of Search ....... 260/2.5 A, 2.5 AH, 2.5 AL, 260/2.5 BE, 2.5 BD, 2.5 AD

[56] References Cited

U.S. PATENT DOCUMENTS

| | | | |
|---|---|---|---|
| 2,834,748 | 5/1958 | Bailey et al. | 260/825 |
| 3,585,230 | 6/1971 | Woycheshin et al. | 260/2.5 AT |

*Primary Examiner*—M. J. Welsh
*Attorney, Agent, or Firm*—Gene Harsh; Joseph C. Gil; R. Brent Olson

[57] ABSTRACT

The instant invention is directed to the post treatment of flexible polyurethane foams. It has been found that the water absorbency and penetration of flexible polyurethane foams can be enhanced by washing and/or impregnating the foam with an aqueous solution of specified organic siloxane surfactants and allowing the treated foam to dry.

4 Claims, No Drawings

POST TREATMENT OF FLEXIBLE POLYURETHANE FOAM WITH ORGANIC SILOXANES FOR INCREASING THE WATER ABSORBENCY AND PENETRATION

BACKGROUND OF THE INVENTION

Flexible polyurethane foams are widely known in the art, and are described, e.g. in "Polyurethanes: Chemistry and Technology," Saunders and Frisch, Part II, 1964, pages 1 through 191, the disclosure of which is herein incorporated by reference. As is known in the art, these flexible polyurethanes can be hydrophilic or hydrophobic depending upon the reactants used in the production thereof. Thus, e.g., hydrophilic flexible polyurethane foams have been produced by utilizing etheylene oxide/propylene oxide based polyethers in the production thereof. Although the incorporation of their so-called block polyethers imparts the desired hydrophilicity, their cost is relatively high.

Additionally, it is known to treat the surfaces of flexible polyurethane foams with a wide variety of materials in order to increase and/or impart hydrophilic properties. These treatments effectively reticulate the foam structure. Characteristic of these treatments are those described in U.S. Pat. Nos. 3,171,280; 3,423,337; 3,423,338 (hydrolytic treatment); 3,025,200 (heat and compression); 3,149,000 (polyacrolein treatment); 3,753,756 (orthotoluidine treatment); 3,382,090 (reacting foam with acrylic-type monomers); and 3,249,465 (treatment with a variety of hydrophilic agents). Additionaly, reticulated foams may be produced by variation of the foam formulations itself (see, e.g., U.S. Pat. Nos. 3,165,483; 3,178,300 and 3,210,300).

A wide variety of silicone surfactants are known in the art. Characteristic of these are so-called polyether-polysiloxane blocked copolymers. Characteristics of these surfactants are those disclosed, e.g., in U.S. Pat. Nos. 3,471,465; 2,834,748; 3,233,986; 3,887,483; 3,686,254; 3,793,300; 3,867,420; 3,280,160; 3,272,762; Re. 27,541 (3,505,377); and 3,585,230.

Finally, it is known to treat elastomeric flexible polyurethane cellular structures with silicone oils of the following formula:

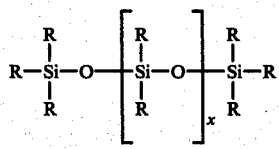

wherein R is an organic radical of relatively low molecular weight and x is a whole number. As disclosed in U.S. Pat. No. 2,992,940, this treatment substantially eliminates internal tack which may be present due to incomplete cure of the freshly prepared elastomeric flexible cellular structure.

DESCRIPTION OF THE INVENTION

It has now been found that the water absorbency and penetration can be greatly enhanced by washing and/or impregnating the foam with an aqueous solution of specified siloxane surfactants and allowing the treated foam to dry. In some instances, a moderate reticulation of the foam is noted.

The siloxanes useable according to the instant invention are selected from the group consisting of (A) compounds of the formula:

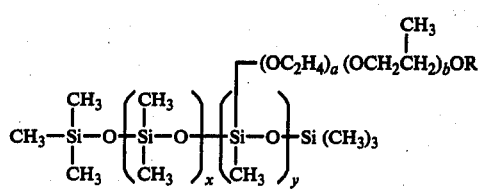

wherein R represents a methyl, ethyl, propyl or butyl group, wherein the silicone chain has an average molecular weight of from about 140 to about 5000, wherein the polyether chain has an average molecular weight of from about 60 to about 3000, wherein x and y are each integers of one or more, and wherein a and b can be 0 or whole numbers, but one of them must be at least 1; and (B) compounds of the formula

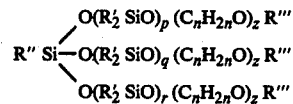

wherein $R'$, $R''$, and $R'''$ are alkyl radicals having from 1 to 4 carbon atoms, p, q and r each have a value of from 4 to 8, and $(C_nH_{2n}O)_z$ is a mixed polyoxyethylene oxypropylene group containing from 15 to 19 oxyethylene units and from 11 to 15 oxypropylene units with z equal to from about 25 to about 34.

Siloxane compounds according to (A) above are known and are described, e.g., in U.S. Pat. No. 3,585,230, the disclosure of which is herein incorporated by reference, while siloxane compounds according to (B) are known and described in U.S. Pat. No. 2,834,748, the disclosure of which is herein incorporated by reference.

By washing and/or impregnating is means thoroughly saturating the foam in the siloxane surfactant solution. This can be accomplished by various means such as spraying, coating or immersing. It is preferred to soak the foam in siloxane solution until saturated, wring the foam, then re-saturate by soaking.

By the instant invention, it is now possible to vary the degree of water absorbency and penetration imparted to the foam by merely regulating the concentration of the siloxane surfactant. Thus, the use of a highly concentrated aqueous solution will produce a foam product which has high water absorbency and penetration, while the use of a low concentration solution will result in a foam having lower water absorbency and penetration. The percentage of organic siloxane surfactant in water can vary over a very wide range. The preferred percentage is 0.25 to 20%, by weight, and most preferably 0.6 to 10%.

Substantially any flexible polyurethane foam may be used according to the invention. However, the degree to which the process of the present invention adds to the water absorbency and penetration of the foams depends in part on the composition of the foam. For example, if hydrophilic foams are used, the extent to which the hydrophilic properties will be enhanced will be small. Also, foams which are made with water in the reaction mixture tend to have more greatly enhanced hydrophilic properties than foam made with less water.

Production of foam polyurethanes itself is well known and accordingly does not constitute a part of this invention. Urethane polymers are most commonly prepared by reacting a polyisocyanate with a composition of compounds with two or more hydrogen atoms which are reactive with isocyanate groups, such as hydroxyl terminated polyethers or polyesters.

Suitable reaction components for the production of foam materials are generally known in the art. The components corresponding to the preferred embodiment, polyurethane foam, are polyisocyanates, polyols and blowing agents catalysts and additives.

The polyisocyanates used in the instant invention include essentially any organic polyisocyanate, including aliphatic, cycloaliphatic, araliphatic, aromatic and heterocyclic polyisocyanates, of the type described for example by W. Siefgen in Justus Liebigs Annalen der Chemie, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and, mixtures of these isomers; 1-isocyanato-3,3,5-trimethyl-5-isocyanato-methylcyclohexane (German Auslegeschrift No. 1,202,785); 2,4- and 2,6-hexahydrotolylene diisocyanate, and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate, and mixtures of these isomers; diphenylmethane-2,4'- and/or -4,4'-diisocyanate; naphthylene-1,5-diisocyanate; triphenylmethane-4,4',4"-triisocyanate; polyphenyl polymethylene polyisocyanates of the type obtained by condensing aniline with formaldehyde, followed by condensation, and described for example, in British Pat. Nos. 874,430 and 848,671; perchlorinated arylpolyisocyanates of the type described in German Auslegeschrift No. 1,157,601; polyisocyanates containing carbodiimide groups of the type described in German Pat. No. 1,092,007; diisocyanates of the type described in U.S. Pat. No. 3,492,330; polyisocyanates containing allophanate groups of the type described in British Pat. No. 994,890, Belgian Pat. No. 761,262 and published Dutch patent application No. 7,102,524; polyisocyanates containing isocyanurate groups of the type described in German Pat. Nos. 1,022,789; 1,022,067; and 1,027,394; and in German Offenlegungsschrift Nos. 1,929,034 and 2,004,048; polyisocyanates containing urethane groups of the type described in Belgian Pat. No. 752,261 or in U.S. Pat. No. 3,394,164; polyisocyanates containing acylated urea groups as described in German Pat. No. 1,230,778; polyisocyanates containing biuret groups of the type described in German Pat. No. 1,101,394, in British Pat. No. 889,050, and in French Pat. No. 7,017,514; polyisocyanates obtained by telomerization reactions of the type described in Belgian Pat. No. 723,640; polyisocyanates containing ester groups of the type described, in British Pat. Nos. 965,474 and 1,072,956, in the U.S. Pat. No. 3,567,763 and in German Pat. No. 1,231,688; and, reaction products of the aforementioned isocyanates with acetals according to German Pat. No. 1,072,385.

It is also possible to use the distillation residues containing isocyanate groups of the type accumulating in the commercial production of isocyanates, optionally in solution in one or more of the aforementioned polyisocyanates. It is also possible to use mixtures of the aforementioned polyisocyanates.

As a rule, it is preferred to use readily available polyisocyanates such as 2,4- and 2,6-tolylene diisocyanate and mixtures of these isomers ("TDI"); polyphenyl polymethylene polyisocyanates of the type obtained by condensing aniline with formaldehyde, followed by phosgenation ("crude MDI"); and, polyisocyanates containing carbodiimide groups, urethane groups, allophanate groups, isocyanurate groups, urea groups or biuret groups ("modified polyisocyanates").

Other starting components suitable for use in accordance with the invention are compounds with at least two isocyanate-reactive hydrogen atoms and a molecular weight of from 62 to 10,000. Such compounds include those containing amino groups, thiol groups, hydroxyl groups, or carboxyl groups. The presently preferred compounds are the polyhydroxyl compounds, more especially polyhydroxyl compounds containing from 2 to 8 hydroxyl groups, and especially those with molecular weight of from 200 to 10,000, and most preferably from 1000 to 6000. Examples include polyesters, polyethers, polythioethers, polyacetals, and polyester amides containing at least 2, generally from 2 to 8 and more preferably from 2 to 4 hydroxyl groups, of the type generally known for the production of homogeneous and cellular polyurethanes. In the process according to the invention, the aforementioned relatively high molecular weight polyhydroxyl compounds are often used in admixture with up to 95%, by weight, preferably with up to 50%, by weight, based on the total quantity of polyhydroxyl compounds, of low molecular weight polyols with molecular weights of from 62 to 200. Low molecular weight polyols of this type include ethylene glycol 1,2-propane diol, 1,3-propane diol, 1,2-butane diol, 1,4-butane diol, 1,6-hexane diol, 1,10-decane diol, diethylene glycol, triethylene glycol, tetraethylene glycol, dipropylene glycol, tripropylene glycol, glycerol, trimethylolpropane and the like.

Suitable hydroxyl-group-containing polyesters include reaction products of polyhydric, preferably dihydric and, optionally, also trihydric alcohols with polyvalent, and preferably divalent, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, by for example halogen atoms, and/or be unsaturated. Examples of polycarboxylic acids of this type include: succinic acid, adipic acid, suberic acid, azelaic acid, sebacic acid, phthalic acid, isophthalic acid, trimellitic acid, phthalic acid anhydride, tetrahydrophtalic acid anhydride, hexahydrophthalic acid anhydride, tetrachlorophthalic acid anhydride, endomethylene tetra-hydrophthalic acid anhydride, glutaric acid anhydride, maleic acid, meleic acid anhydride, fumaric acid, dimeric and trimeric fatty acids, such as oleic acid, optionally in admixture with monomeric fatty acids, terephthalic acid dimethyl ester and terephthalic acid bis-glycol ester. Examples of suitable polyhydric alcohols include: ethylene glycol, 1,2-propylene glycol and 1,3-propylene glycol, 1,4- and 2,3-butylene glycol 1,6-hexane diol, 1,8-octane diol, neopentyl glycol, cyclohexane dimethanol (1,4-bis-hydroxymethyl cyclohexane), 2-methyl-1,3-propane diol, glycerol, trimethylolpropane, 1,2,6-hexane triol, 1,2,4-butane triol, trimethylolethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may also contain some terminal carboxyl groups. Polyesters of lactones, for example ε-caprolactone, or hydroxycarboxylic acids, for example ω-hydroxy caproic acid, may also be used.

The polyethers containing at least 2, generally 2 to 8, preferably 2 to 3, hydroxyl groups suitable for use in accordance with the invention are also known and may be obtained, for example, by polymerizing epoxides, such as ethylene oxide, propylene oxide, butylene oxide, tetrahydrofuran, styrene oxide or epichlorhydrin in the presence of $BF_3$, or by chemically adding these epoxides, optionally in admixture or successively to components containing reactive hydrogen atoms, such as water, alcohols, or amines. These components include then, water, ethylene glycol, 1,3-propylene glycol or 1,2-propylene glycol, trimethylolpropane, 4,4′-dihydroxy diphenylpropane, aniline, ammonia, ethanolamine and ethylene diamine. Sucrose polyethers of the type described in German Auslegeschriften Nos. 1,176,358 and 1,064,938 may also be used in accordance with the invention. In many cases, it is preferred to use polyethers of the type which contain substantial amounts of primary OH-groups (up to 90%, by weight, based on all the OH-groups present in the polyether). Polyethers modified by vinyl polymers, of the type formed, for example, by polymerizing styrene, acrylonitrile in the presence of polyethers (U.S. Pat. Nos. 3,383,351; 3,304,273, 3,523,093; and 3,110,695, and German Pat. No. 1,152,536), are also suitable, as are polybutadienes containing OH-groups.

Among the polythio ethers, reference is made in particular to the condensation products of thiodiglycol with itself and/or with other glycols, dicarboxylic acids, formaldehyde, aminocarboxylic acids or amino alcohols. The products are polythio mixed ethers, polythio ether esters or polythio ether ester amides, depending upon the co-components.

Examples of suitable polyacetals are the compounds obtainable from glycols, such as diethylene glycol, triethylene glycol, 4,4′-dioxethoxy diphenyl dimethylmethane, hexane diol, and formaldehyde. Polyacetals suitable for use in accordance with the invention may also be obtained by polymerizing cyclic acetals.

Suitable polycarbonates containing hydroxyl groups are known and may be obtained, for example, by reacting diols, such as 1,3-propane diol, 1,4-butane diol and/or 1,6-hexane diol, diethylene glycol, triethylene glycol, tetraethylene glycol, with diaryl carbonates such as diphenyl carbonate, or phosgene.

The polyester amides and polyamides include, for example, the predominantly linear condensates obtained from polyvalent saturated and unsaturated carboxylic acids or their anhydrides and polyhydric, saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the invention.

Representatives of the many and varied compounds usable in accordance with the invention may be found, for example, in High Polymers, Volume XVI "Polyurethane, Chemistry and Technology," by Saunders-Frisch, Interscience Publishers, New York, London, Volume I, 1962 pages 32 to 42 and pages 44 to 54, and Volume II, 1964, pages 5 to 6 and 198 to 199; and, in Kunststoff-Handbuch, Volume VII, Vieweg-Hochtlen, Carl-Hanser-Verlag, Munich, 1966, pages 45 to 71.

In the process according to the invention, the reactants (including the water optionally used as blowing agent) are used in quantitative ratios corresponding to an NCO-characteristic of 70 to 160. (The NCO-characteristic 100 signifies the presence of equivalent quantities of isocyanate groups and active hydrogen atoms reacting with those isocyanate groups in the reaction mixture.)

According to the invention, water and/or readily volatile organic substances are often used as blowing agents. Examples of organic blowing agents include: acetone; ethylacetate; methanol; ethanol; halogen-substituted alkanes such as methylene chloride, chloroform, ethylidene, chloride, vinylidene chloride, monofluorotrichloromethane, chlorodifluoromethane, and dichloro difluoromethane; butane; hexane; heptane; diethyl ether; and the like. A blowing effect may also be obtained by adding compounds which decompose at temperatures above room temperature, giving off gases (for example, nitrogen). Such compounds include azo compounds, such as azoisobutyronitrile. Other examples of blowing agents and details of their use may be found in Kunststoff-Handbuch, Volume VII, Vieweg and Hochtlen, Carl-Hanser-Verlag, Munich, 1966, pages 108 and 109, 435 to 455 and 507 to 510.

In addition, catalysts are often used in accordance with the invention. Suitable catalysts include tertiary amines, such as triethylamine, tributylamine, N-methyl morpholine, N-ethyl morpholine, N-coco morpholine, N, N, N′, N′-tetramethylethylene diamine, 1,4-diazabicyclo-(2,2,2)octane, N-methyl-N′-dimethylamino ethyl piperazine, N,N-dimethylbenzylamine, bis-(N,N-diethylamino ethyl)-adipate, N,N-diethylbenzylamine, pentamethyl diethylene triamine, N,N-dimethyl cyclohexylamine, N,N,N′, N′-tetramethyl-1,3-butane diamine, N,N-dimethyl-β-phenylethylamine, 1,2-dimethylimidazole and 2-methylimidazole.

Tertiary amines containing isocyanate-reactive hydrogen atoms can also be used and include triethanolamine, triisopropanolamine, N-methyl diethanolamine, N-ethyl diethanolamine, N,N-dimethylethanolamine, and their reaction products with alkylene oxides, such as propylene oxide and/or ethylene oxide.

Other suitable catalysts include silaamines with carbon-silicon bonds of the type described in German Pat. No. 1,229,290, such as 2,2,4-trimethyl-2-sila morpholine and 1,3-diethylamino methyl tetramethyl disiloxane.

Other suitable catalysts include nitrogen-containing bases such as tetraalkyl ammonium hydroxides; alkali hydroxides, such as sodium hydroxide; alkali phenolates, such as sodium phenolate; or alkali alcoholates, such as sodium methylate. Hexahydrotriazines may also be used as catalysts. According to the invention, organometallic compounds such as organo tin compounds, may also be used as catalysts.

Preferred organo tin compounds are tin(II) salts of carboxylic acids, such as tin(II) acetate, tin (II) octoate, tin(II) ethyl hexoate and tin(II) laurate, and the dialkyl tin salts of carboxylic acids, such as dibutyl tin diacetate, dibutyl tin dilaurate, dibutyl tin maleate or dioctyl tin diacetate.

Further representatives of catalysts suitable for use in accordance with the invention, and particulars of the way in which the catalysts work, may be found in Kunststoff-Handbuch, Volume VII, Vieweg and Hochtlen, Carl-Hanser-Verlag, Munich, 1966, pages 96 to 102.

The catalysts are generally used in a quantity of from about 0.001 to 10%, by weight, based on the quantity of compounds with at least two isocyanate-reactive hydrogen atoms and molecular weights of from 62 to 10,000.

According to the invention, it is also possible to use surface-active additives (emulsifiers and foam stabilizers). Examples of suitable emulsifiers include the sodium salts of castor oil sulphonates; the sodium salts of fatty acids; the salts of fatty acids with amines, such as oleic acid/diethylamine or stearic acid/diethanolamine. Alkali or ammonium salts of sulfonic acids such as dodecyl benzene sulfonic acid or dinaphthylmethane disulfonic acid; of fatty acids, such as ricinoleic acid; or, of polymeric fatty acids, may also be used as surface-active additives.

Suitable foam stabilizers include water-soluble polyether siloxanes. These compounds are generally synthesized in such a way that a copolymer of ethylene oxide and propylene oxide is attached to a polydimethyl siloxane radical. Foam stabilizers of this type are described in U.S. Pat. No. 3,201,372.

According to the invention, it is also possible to use reaction retarders such as acid-reacting substances, such as hydrochloric acid or organic acid halides; cell regulators such as paraffins or fatty alcohols or dimethyl polysiloxanes; pigments; dyes; flame-proofing agents such as tris-chloroethylphosphate or ammonium phosphate and polyphosphate; stabilizers against ageing and weathering; plasticizers; fungistatic and bacteriostatic agents; and, fillers, such as barium sulphate, kieselguhr, carbon black or whiting.

According to the invention, it is also possible to include surfactants in the make-up of the foam. Any surfactant may be used. The surfactant additives may be used in addition to the specified surfactant wash of the instant invention.

Other examples of the many and varied additives which may be used in the instant invention, together with particulars on the way in which these additives are used and the manner in which they work, may be found in Kunststoff-Handbuch, Volume VI, Vieweg und Hochtlen, Carl-Hanser-Verlag, Munich, 1966, for example on pages 103 to 113.

The foamed products of the present invention may be used as other hydrophilic foams are used. Specifically, the foams of the present invention may be used as sponges, absorbent pads, tampons or paint brushes.

The following examples are intended to illustrate the invention. Unless otherwise specified, all parts are parts by weight.

To illustrate the hydrophilic properties of the foams of the present invention, four tests were conducted. In the drop penetration test, one drop of water from an eye dropper was placed on the surface of the foamed product and the time period which elapsed before the drop entered the foam and was no longer visible was measured. In a second test, the volume swell test, the volume of the foam product was measured both before and after the foam was immersed in and saturated with water. The third test was a sink time test. In this test, a piece of foam measuring 2 × 2 × 1 inches was placed on the surface of water and the time which elapsed before the foam sank below the surface of the water was measured. The final test was a water absorption test. In the water absorption test, the foam sample was saturated with water and then hung up on a rack by one edge so that the water could drain from the foam sample. The weight of the foam immediately after, 30 seconds after, 1 minute after and 5 minutes after, the foam was saturated with water was measured.

EXAMPLE 1

Five foams were produced which have the compositions shown in Table 1. The foams with compositions A and B were hand mixed and molded in a 12 × 12 × 6 inch mold. Foam compositions C, D and E were produced on a Hennecke high pressure machine, model number UBT-65. Each of the foams was soft but not hydrophilic.

The foams A and B of the above composition were then washed until thoroughly wet, wrung out, and then rewashed until thoroughly wetted in a 10% solution of

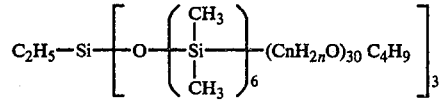

and then dried. A portion of the foams A and B was also saved as a control. Foams C, D and E were washed until thoroughly wet, wrung out, and then re-washed until thoroughly wetted with a 10% solution of Union Carbide L-548 and then dried. The exact structure of Union Carbide L-548 is not known, however, it is known to fit within the formula on page 3, line 12. Again, portions of the foams were saved as controls. Each of the treated and untreated foams were then tested by drop penetration, volume swell, sink time and water absorption. The results are shown in Table II.

Table II demonstrates that each of the treated foams equalled or excelled in all hydrophilic properties. The test results also show that the polyether used to make the foam is not that critically important.

Table 1

| Parts by Weight of Foam Components | A | B | C | D | E |
|---|---|---|---|---|---|
| Ethylene-Propylene oxide base polyether, OH number = 45 with primary OH groups | 100 | | | | |
| Ethylene-Propylene oxide base polyether, OH number = 56 with primary OH groups | | 100 | | | |
| Ethylene-Propylene oxide base polyether, OH number = 49 with secondary OH groups | | | 100 | 100 | 100 |
| Toluene diisocyanate | 55 | 55 | 61.8 | 49 | 35.7 |
| Water | 6 | 6 | 4.7 | 4.0 | 2.7 |
| $CCl_3F$ | 25 | 25 | 4.5 | | |

Table 1-continued

| Parts by Weight of Foam Components | A | B | C | D | E |
|---|---|---|---|---|---|
| Desmorapid PS 207 available from Bayer AG, and comprising a blend of dimethylethanol amine, N-methyl-N'-dimethylaminoethyl piperazine and a silaamine. | | | .12 | .12 | .01 |
| Stanous octoate | .3 | .3 | .22 | .22 | .22 |
| Triethylene diamine | .5 | .5 | | | |
| N-Ethylmorphenylene | .3 | .3 | | | |
| Tris-2,2' dimethylamino ethylether | .2 | .2 | | | |
| UCC - L 548 silicone surfactant | | | .9 | .8 | .6 |
| 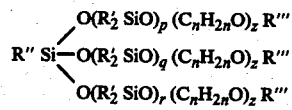 ($C_9H_{19}C_6H_4OH$) | 1.5 | 1.5 | | | |
| | 10.0 | 10.0 | | | |

Table II

| | A treated/untreated | | B treated/untreated | | C treated/untreated | | D treated/untreated | | E treated/untreated | |
|---|---|---|---|---|---|---|---|---|---|---|
| Test Results | | | | | | | | | | |
| Drop penetration (seconds) | <1 | >120 | <1 | >120 | 1 | >120 | 6.5 | >120 | 5 | >120 |
| Volume swell % | 3 | 10 | 3 | 2 | 6 | 2 | 2 | 0 | 4 | 0 |
| Sink time (seconds) | 90 | >300 | 116 | >300 | 91 | no sink | 200 | no sink | .433 | no sink |
| Water absorption | | | | | | | | | | |
| 0 minutes | 44.6 | 50.3 | 55.6 | 51.2 | 46.9 | 46.3 | 37.8 | 38.9 | 27.0 | 28.6 |
| ½ minute | 9.8 | 16.2 | 18.9 | 23.3 | 18.4 | 20.8 | 16.6 | 18.7 | 13.7 | 14.4 |
| 1 minute | 8.9 | 13.8 | 16.7 | 18.1 | 17.0 | 19.9 | 15.0 | 17.4 | 11.5 | 13.2 |
| 5 minutes | 8.8 | 12.3 | 14.1 | 15.7 | 15.6 | 17.2 | 13.8 | 15.8 | 9.7 | 11.6 |

What is claimed is:

1. A method of increasing the water absorbency and penetration of a flexible polyurethane foam comprising washing and/or impregnating said foam with an aqueous solution of siloxane wherein said siloxane is selected from the group consisting of (A)

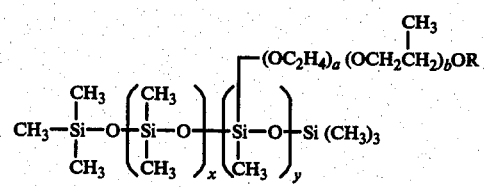

wherein R represents a methyl, ethyl, propyl or butyl group, wherein the silicone chain has an average molecular weight of from about 140 to about 5000, wherein the polyether chain has an average molecular weight of from about 60 to about 3000, wherein x and y are each integers of 1 or more, and wherein a and b can be 0 or whole numbers, but one of them must be at least 1; and (B) compounds of the formula $$R'' Si \begin{cases} O(R'_2 SiO)_p (C_nH_{2n}O)_z R''' \\ O(R'_2 SiO)_q (C_nH_{2n}O)_z R''' \\ O(R'_2 SiO)_r (C_nH_{2n}O)_z R''' \end{cases}$$

wherein R', R'', and R''' are alkyl radicals having from 1 to 4 carbon atoms, p, q or r each have a value of from 4 to 8, and $(C_nH_{2n}O)_z$ is a mixed polyoxyethylene oxypropylene group containing from 15 to 19 oxyethylene units and from 11 to 15 oxypropylene units with z equal to from about 26 to about 34.

2. The method as recited in claim 1 wherein the siloxane concentration in water is 0.25 to 20%.

3. The method as recited in claim 1 wherein the siloxane concentration in water is 0.6 to 10%.

4. The method as recited in claim 1 wherein the siloxane is selected from the compound (B) and R'' is $C_2H_5$, R' is $C_2H_6$, p is 6, q is 6, r is 6, z is 30 and R''' is $C_4H_9$.

* * * * *